Patented July 19, 1938

2,124,495

UNITED STATES PATENT OFFICE 2,124,495

TREATMENT OF DRILL HOLES

Harold C. Miller, Oakland, Calif., assignor of ten percent to Gerald B. Shea, Oakland, Calif., twenty percent to James W. Weir, Los Angeles, Calif., twenty percent to Henry S. Montgomery and twenty percent to Alfred W. Knight, both of South Pasadena, Calif.

No Drawing. Application April 4, 1936, Serial No. 72,772

2 Claims. (Cl. 255—1)

This invention relates, in general, to the introduction of mud fluids into drill holes, such as oil, gas, or other wells, either during a rotary drilling operation or in some other operation, such as that of temporarily "shutting in" a producing well, in which such a mud fluid is caused to form a sheath or deposit of mud on the bore walls or elsewhere in the drill hole. The invention is concerned more particularly with the problem of removing mud sheaths or deposits so formed, and includes certain advantageous methods or steps employing a mud fluid of novel composition for the purpose of facilitating such removal, and also includes the subsequent removal of such mud sheaths or deposits.

The principal object of my invention is to facilitate or make possible the effective and substantially complete removal, by chemical means, of such mud sheaths from the faces of the producing sands or formations penetrated by a drill hole, and thus permit free flow of oil, gas, or other fluid into the drill hole.

A particular object of the invention is to render the mud sheath, within the drill hole and in interstices of porous or loose formations penetrated thereby, susceptible to effective disintegration by chemical means.

A further object of the invention is to provide for the formation, within a drill hole, of a mud sheath which later may be readily disintegrated and removed to expose producing sands or formations.

A further object of the invention is to provide an advantageous type of mud fluid for use in a rotary drilling, shutting-in or other operation in a drill hole, such mud fluid being conditioned or prepared by the addition thereto of a suitable substance or reagent, so that the mud sheath or deposit formed by said mud fluid is rendered susceptible to effective disintegration by chemical action.

A further object of the invention is to provide an advantageous mixture of solid materials for use in preparing a mud fluid of such composition that mud sheaths formed therewith may be readily disintegrated by chemical means.

A further object of the invention is to provide a method involving circulation or introduction of such a prepared mud fluid in a drill hole to form a mud sheath on the walls thereof, either during a drilling operation or for some other purpose, and the subsequent disintegration and removal of such mud sheath by chemical means.

Other objects of the invention will be pointed out hereinafter or will be apparent from the following description.

My invention is based upon the preparation and use of a mud fluid containing an added substance which will react with an acid to form a gas. The mud fluid containing said added substance in suitable proportion is introduced into a drill hole, as for example in a rotary drilling or shutting-in operation, so as to form a mud sheath or coating containing said added substance intimately associated with the other solid constituents of the mud. When it is desired to remove the mud sheath, the operator may simply introduce into the drill hole a suitable acid, preferably in aqueous solution, which will react with said added substance to form a gas, whereby the bubbles of gas so evolved within and throughout the mud sheath will serve to effectively disintegrate or break up the mud, and the disintegrated mud material may then be pumped or bailed out of the hole.

According to a preferred embodiment of the invention, the gas-evolving substance added to the mud fluid is a solid carbonate compound having only a relatively low solubility in water, and the acid subsequently introduced, to react with said carbonate compound and form gas, is hydrochloric acid in aqueous solution.

As typical examples of added substances of the preferred type above mentioned, I may mention calcium carbonate in various forms, either alone or containing small amounts of different naturally occurring impurities. For example, I may use limestone, chalk, oyster shells, coral, or other naturally occurring calcium carbonate-bearing material, preferably in finely ground or pulverized condition. Calcium carbonate is only very slightly soluble in water, but is rapidly dissolved by hydrochloric acid solutions, forming water-soluble calcium chloride and carbon dioxide gas. Other examples of gas-forming substances which may be used will be mentioned hereinafter.

The limestone or other gas-forming substance may be incorporated in the mud fluid in any suitable manner, as for example by first mixing the same with one or more of the solid constituents of the mud fluid, in the substantial absence of added water, and then mixing the same with a suitable proportion of water and with any other desired solid constituents, or by adding said limestone or other gas-forming substance to a previously prepared mud fluid containing water and solid mud constituents.

It has previously been proposed to remove mud sheaths from drill holes by introducing aqueous solutions of hydrochloric acid, the intended purpose of this treatment being to alter the physical characteristics of the solids in the mud sheath, and possibly to dissolve certain constituents thereof, thereby causing the mud to disintegrate or slough off from the walls. This method, however, has not been found effective in actual practice, since it did not accomplish a sufficiently complete disintegration of the mud coating to effectively remove the same. It has been found that clays ordinarily used in making mud fluids, and clays having the necessary physical characteristics for such use, do not contain a sufficiently high proportion of calcium carbonate or other gas-forming substance to make the resulting mud sheaths susceptible to rapid and effective disintegration by evolution of gas upon contact with acid, as contemplated in the present invention. Such clays may in some cases contain relatively small proportions of calcium carbonate, but the proportion thereof would in any case be so small that, upon contact of acid therewith, the number and rate of liberation of bubbles of carbon dioxide gas, and the total amount of gas evolved per unit volume of the mud sheath, would be insufficient to effectively disintegrate the mud. Furthermore, the amount and rate of gas evolution would not be such as to agitate the acid solution in the drill hole sufficiently to prevent the formation of equilibrium conditions at the face of the mud sheath with consequent substantial cessation of the gas-evolving reaction.

Therefore, I propose to add calcium carbonate or other gas-evolving substance in larger proportion than is naturally present in the clay. In general, it may be said that the amount of such gas evolving substance incorporated in the mud fluid should be such as to cause the mud sheath formed therewith to be thoroughly impregnated with such substance, in sufficient proportion to the other solid constituents present in such mud sheath, so that the number and rate of evolution of gas bubbles produced upon contact of acid therewith will be sufficient to provide an effective disintegration of the mud sheath and considerable agitation of the acid solution adjacent the exposed surface of such mud sheath. However, for best results both in the use of the mud fluid and in the subsequent removal of the mud sheath, the amount of such added substance should be more than a relatively small proportion of the total solids present in the mud fluid and in the mud sheath, and such solids should in any case consist principally of clay having the characteristics required for making mud fluids for use in drill holes, i. e., proper specific gravity and proportion of colloidal matter.

I have found that a very effective disintegrating action is obtained by adding limestone or other calcium carbonate-bearing material in amounts from about 10% to about 15%, by weight, of the other solid constituents of the mud fluid, including the clay and any other non-gas-forming solid materials such as those hereinafter mentioned. However, as little as 5% calcium carbonate may be sufficient in some cases, although I have found that if the proportion is materially less than about 10%, the rate of disintegration is considerably reduced and it is difficult to obtain complete disintegration even after a relatively long period of contact with the acid solution. On the other hand, it is possible to use as much as 18% to 20% or more of calcium carbonate, on the above basis, but the use of such increased proportions does not appear to give as satisfactory results as proportions within the preferred range above mentioned, and furthermore involves an extra expense for chemicals used.

In general, it may be said that the proportion of calcium carbonate or other added gas-evolving substance should be between 5% and 25%, and preferably between about 10% and 15%, by weight, of the other solid constituents present in the mud fluid or in the prepared mixture of solid materials for use in making the mud fluid. The optimum or most desirable proportion may vary in different cases, due to the composition and properties of the mud fluid, the nature of the formations encountered, conditions of use, cost of chemicals, and other factors, and allowance may also be made for any relatively small proportion of calcium carbonate or other gas-forming substance present in the clay.

Calcium carbonate is particularly advantageous since it does not appear to appreciably influence or alter in any way the colloidal or other physical or chemical properties of the mud fluid. There is no perceptible thickening of the fluid such as ordinarily occurs when calcium oxide or hydroxide is added, nor is there any adverse effect on the wall-building properties of the fluid. Furthermore, being only very slightly soluble in water, the calcium carbonate remains distributed throughout the mud sheath, in substantially the same proportion to the other solid constituents as in the mud fluid introduced into the hole. In addition, the specific gravity of limestone as well as most other readily available sources of calcium carbonate, approximates quite closely the specific gravity of the clays ordinarily used.

It will be understood that other materials may also be incorporated in the drilling fluid, together with the clay and the added gas-evolving substance. Thus, it may in some cases be desirable to add a weighting material such as hematite or barytes, or to add a highly colloidal clay or clay-like mineral such as bentonite, as well known in the art, and such additional materials may be mixed with the clay and the added gas-forming substance either prior to, during, or after the addition of water to form the desired mud fluid.

As a specific example, a mud fluid according to the present invention may be prepared by mixing with water, a suitable clay having the necessary characteristics for making mud fluids for use in drill holes, and limestone or other calcium carbonate material ground to a fineness of about 85% through 200 mesh, in the proportions of about 5 pounds of dry clay and ½ to ¾ pound of calcium carbonate to each gallon of water, and thoroughly agitating the mixture to form a uniform suspension.

As another specific example, the suitable clay and the calcium carbonate may be first mixed together in the substantial absence of water, in the proportions of 5 pounds of dry clay and ½ to ¾ pound of calcium carbonate, preferably in pulverulent or divided condition, and the desired proportion of water may subsequently be added to this mixture. Such a prepared mixture of dry clay and calcium carbonate may be made and sold as such, and the operator may then simply add the water to make a mud fluid for introduction into a well.

The expression "dry clay" as used in the above described examples, is understood to mean ordinary air-dried clay, which usually contains some water mechanically associated therewith. In addition to chemically combined water which may be present in the minerals of which the clay is composed, ordinary air-dried clays of the type above described generally contain up to about 5%, and may in some cases contain up to about 10% or more, of mechanically associated water.

A mud fluid prepared as above described may be introduced into a drill hole in any suitable or conventional manner, to cause formation of a sheath or deposit on the surfaces of the formation or elsewhere in the drill hole. Such fluid, for example, may be circulated in and out of the hole in a rotary drilling operation, either throughout such operation or only while drilling through certain producing formations, so that the resulting mud sheath, or the portions thereof at the faces of such producing formations, will be formed of mud containing the added calcium carbonate or other gas-forming substance intimately and uniformly dispersed or distributed therein, in suitable proportion, throughout the entire thickness thereof. It will be understood that the composition of the mud fluid, during circulation through the drill hole, may be maintained as desired by addition of clay or other solid material, or water, thereto, or by the addition of further quantities of calcium carbonate or other gas-forming substance. For example, when drilling through clay formations, portions thereof may become suspended in the mud fluid, and additional calcium carbonate or the like may be added in corresponding proportion, it being understood that the proportion of gas-forming substance in the mud fluid is preferably maintained within the limits above mentioned.

After the drilling is completed, or at such later time as it is desired to open up the producing formation or formations coated by the mud sheath, and if such mud sheath is not readily removed by a simple washing operation or the like, disintegration and removal thereof may be accomplished as follows. Any undeposited mud fluid remaining in the hole is preferably first removed; as by bailing or washing, and a suitable quantity of aqueous hydrochloric acid solution may then be introduced into the hole, in position to contact the mud sheath formed from the prepared mud fluid, or such portion thereof as it is desired to remove. The hydrochloric acid solution may be of any desired concentration. The rate of reaction varies with the concentration, and a concentration of about 10% to 15% HCl is generally satisfactory. A suitable "inhibitor" reagent, such as described in U. S. Patent No. 1,877,504 may be employed in the acid solution to prevent undue attack on the metallic equipment, as will be apparent to one skilled in the art, and it has been found that such inhibitors have no observable effect upon the activity of the acid with respect to the non-metallic gas-forming constituent of the mud.

The acid solution quickly dissolves calcium carbonate particles contacted thereby, as such solution penetrates the mud sheath, forming calcium chloride which is dissolved, and carbon dioxide, which is liberated in the form of many small gas bubbles within the mud sheath and exerts a sort of blasting action on the mud, effectively disintegrating or loosening the same. The disintegrated mud sloughs off from the walls and goes into suspension in the acid solution, permitting the acid to directly contact freshly exposed portions of the mud sheath and penetrate more and more deeply into the mud, and this action continues until the entire mud sheath is disintegrated and removed from the walls or until the acid is exhausted. If the latter situation occurs, the spent solution and disintegrated mud may be removed from the hole, as by bailing or washing, and a fresh charge of acid introduced, and it will be understood that this may be done at any desired intervals, in order to speed up the action, without necessarily waiting for each acid charge to be completely spent or exhausted.

The actual operation of introducing the acid solution into the drill hole to secure the desired contact thereof with the mud sheath, and the operations of removing the spent solution and portions of disintegrated mud, as by direct pumping operations or by the use of "bailers", will be apparent to one skilled in the art. The pressure of the acid solution at the region where disintegration is desired is preferably maintained only about equal to or slightly greater than the formation pressure, so as to promote gradual penetration of the acid into and through the mud sheath without causing undue flow of acid or disintegrated mud into the formation, although higher pressures approaching the limiting pressure at which the carbon dioxide would wholly remain in solution, may be employed. The disintegration of the mud sheath may in some instances be accelerated by causing variations in the hydrostatic head of the acid solution during disintegration to alternately force acid into the sheath and then reduce the pressure to permit more active gas evolution or to secure a varied or intermittent evolution of the gas, or by introducing air or other gas under pressure into the acid column, or otherwise agitating the column, as will be apparent to those skilled in the art.

The time of contact will depend, for example, upon the thickness and character of the mud sheath, the proportion of contained gas-evolving reagent, and upon the temperature, pressure, and concentration of acid employed. This time may vary from a few hours up to one day or longer.

A prepared mud of the type above described, containing the added gas-evolving constituent may also be employed for conditioning wells for suspension of production, as by introducing the mud fluid into the well in any suitable manner to fill the hole to above the producing formation or higher, and the well may be restored to producing condition by pumping or bailing the residual fluid mud from the well and removing any formed mud sheath by the above-mentioned acid treatment.

Numerous departures may be made from the preferred embodiment of the invention as above described. For example, other carbonate compounds of relatively low solubility in water, such as magnesite (magnesium carbonate), dolomite (calcium-magnesium carbonate), or witherite (barium carbonate), may be incorporated in the mud fluid, instead of the limestone or other calcium carbonate material, any of these materials being adapted to react with acid and evolve carbon dioxide gas. Furthermore, the invention is not restricted to the use of carbonate compounds. Other compounds capable of reacting with acid to form gases may also be added to the mud fluid. For example, I may use suitable proportions of such compounds as sulphites of alkaline earth metals, which will react with acid to evolve sulphur dioxide. It will also be understood, of course, that two or more gas-forming substances such as above described may be used, if desired.

Other acids, such as sulphuric acid, may also be used to react with the gas-forming substance present in the mud sheath. However, when the gas-forming substance used is a calcium compound, such as calcium carbonate, I prefer in general to use hydrochloric acid, due to the relatively high solubility of calcium chloride formed by the reaction of hydrochloric acid with such calcium compound, as compared with the relatively low solubility of calcium sulphate. More generally, it may be said that the acid employed is preferably one whose acidic radical will form a readily water-soluble salt with the metallic element of the gas-forming substance present in the mud. Another advantage of the use of hydrochloric acid is the fact that the action of such acid in aqueous solution, on the casing or other metal parts within the drill hole may be very largely overcome by the use of suitable inhibiting agents, such as above mentioned.

It will also be understood that any suitable means may be employed for introducing the acid solution into the drill hole and for bringing the same into contact with the mud sheath. For example, instead of mechanically introducing an aqueous solution of acid, I may introduce into the drill hole a suitable quantity of HCl gas, or other gas which will dissolve in or combine with water to form an acid solution, and such gas may be introduced by forcing it under suitable pressure through a pipe extending to the desired depth. The water required to dissolve or combine with such gas may be either water which is already present in the hole, or it may be introduced into the hole for this express purpose, and in either case an inhibitor such as above mentioned may be dissolved in the water prior to introduction of the gas. The amount of gas so supplied should be sufficient to form, with the water present, an aqueous solution of sufficient acid concentration to rapidly react with the gas-forming substance present in the mud sheath, in the manner above described.

The mud fluid described herein, the method of forming a mud sheath in a drill hole by the use of such a mud fluid in such manner as to provide a mud sheath which may be removed readily by subsequent treatment, and the prepared mixture of solid materials adapted for use in making such a mud fluid, are claimed in a divisional application filed by me on March 12, 1938, Serial No. 195,601.

I claim:

1. The method which comprises: introducing into a drill hole a mud fluid consisting principally of water and clay having suitable characteristics for making mud fluids for use in drill holes, and also containing an added non-metallic substance of low solubility in water which will react with an acid to form a gas, the proportion of said added substance being less than 25% and not materially less than 10% by weight of the other solid constituents of said fluid; depositing solid constituents of said mud fluid within said drill hole to form a mud sheath consisting principally of said clay and containing said added substance intimately dispersed therein; subsequently introducing into the drill hole an aqueous solution of acid in such manner as to cause said acid solution to contact said added substance within said mud sheath, to cause evolution of gas and consequent removal of said mud sheath by the disintegrating action of gas so evolved; and removing the resulting disintegrated solids from said drill hole.

2. The method which comprises: introducing into a drill hole a mud fluid consisting principally of water and clay having suitable characteristics for making mud fluids for use in drill holes, and also containing added calcium carbonate in ground condition in a proportion less than 25% and not materially less than 10% by weight of the other solid constituents of said fluid; depositing solid constituents of said mud fluid within said drill hole to form a mud sheath consisting principally of said clay and containing said added calcium carbonate intimately dispersed therein; subsequently introducing into the drill hole an aqueous solution of acid in such manner as to cause said acid solution to contact said calcium carbonate within said mud sheath, to cause evolution of carbon dioxide gas and consequent removal of said mud sheath by the disintegrating action of gas so evolved, and removing the resulting disintegrated solids from said drill hole.

HAROLD C. MILLER.